US012234677B1

(12) United States Patent
Jones

(10) Patent No.: US 12,234,677 B1
(45) Date of Patent: Feb. 25, 2025

(54) HORIZONTAL SCREEN DECK DRAIN SYSTEM, SCREEN DECK DRAIN, AND METHOD OF USE

(71) Applicant: DACON VENTURES, LLC, Orlando, FL (US)

(72) Inventor: David Jones, Orlando, FL (US)

(73) Assignee: Dacon Ventures, LLC, Orlando, FL (US)

( * ) Notice: Subject to any disclaimer, the term of this patent is extended or adjusted under 35 U.S.C. 154(b) by 0 days.

(21) Appl. No.: 18/232,436

(22) Filed: Aug. 10, 2023

Related U.S. Application Data

(60) Provisional application No. 63/404,694, filed on Sep. 8, 2022.

(51) Int. Cl.

| | |
|---|---|
| ***E05D 15/06*** | (2006.01) |
| ***E04B 1/00*** | (2006.01) |
| ***E04B 1/61*** | (2006.01) |
| ***E06B 1/70*** | (2006.01) |
| ***E06B 3/46*** | (2006.01) |
| ***E06B 7/14*** | (2006.01) |

(52) U.S. Cl.
CPC ............ *E05D 15/0686* (2013.01); *E06B 1/70* (2013.01); *E06B 3/4636* (2013.01); *E06B 7/14* (2013.01); *E04B 1/0046* (2013.01); *E04B 1/617* (2013.01)

(58) Field of Classification Search
CPC ..... E05D 15/0686; E06B 1/70; E06B 3/4636; E06B 7/14
See application file for complete search history.

(56) References Cited

U.S. PATENT DOCUMENTS 5,529,436 A * 6/1996 Meyers .................... E03F 3/046 405/118
6,027,283 A * 2/2000 Schweinberg .......... E03F 3/046 405/118
6,141,916 A * 11/2000 Shackelford ............ E03F 3/046 52/12
6,761,008 B2 * 7/2004 Chen ..................... B29C 65/564 52/309.1
6,973,757 B2 * 12/2005 Marks ..................... E04F 17/00 52/302.1

(Continued)

OTHER PUBLICATIONS

Jeff Hall, PestGuard WaterGate—Safety Railing Balcony Drains, 2017, YouTube, https://www.youtube.com/watch?v=zMOp9yZ-t50 (Year: 2017).*

*Primary Examiner* — Omar F Hijaz
(74) *Attorney, Agent, or Firm* — Terry M. Sanks, Esq.; Beusse Sanks, PLLC

(57) ABSTRACT

A drain device for a screen enclosure having deck sill track portions, where two adjacent deck sill track portions form a pair of deck sill track portions. The device includes a U-shaped body having a first side, a second side, and a top surface extending between the first side and the second side. The body includes a screen attaching side and an opening that forms a drain port under the top surface and between the first side and the second side. The device includes concealed fasteners that couple the U-shaped body between and to the pair of deck sill track portions and so that the top surface of the U-shaped body is flush with a top surface of each deck sill track portion of the pair of deck sill track portions. A screen enclosure system is provided that includes multiple drain devices.

20 Claims, 11 Drawing Sheets

(56) References Cited

U.S. PATENT DOCUMENTS

| | | | | |
|---|---|---|---|---|
| 7,937,899 | B2 * | 5/2011 | Earls | E02D 31/02<br>52/302.7 |
| 11,536,017 | B2 * | 12/2022 | VanHoose | E03F 5/10 |
| 2004/0163342 | A1 * | 8/2004 | Marks | E04F 17/00<br>52/302.1 |
| 2009/0151274 | A1 * | 6/2009 | Earls | E02D 31/02<br>52/169.5 |
| 2009/0223147 | A1 * | 9/2009 | Spignesi | E04F 17/00<br>52/302.3 |

* cited by examiner

HORIZONTAL SCREEN DECK DRAIN SYSTEM, SCREEN DECK DRAIN, AND METHOD OF USE

CROSS-REFERENCE TO RELATED APPLICATIONS

This application claims priority benefit of U.S. Provisional Application No. 63/404,694, titled "HORIZONTAL SCREEN DECK DRAIN SYSTEM, SCREEN DECK DRAIN, AND METHOD OF USE," filed Sep. 8, 2022, incorporated herein by reference in its entirety.

BACKGROUND

The embodiments are related to a horizontal screen deck drain system, a screen deck drain and method of use to drain water from a screened in enclosure.

Screen enclosures are used to enclose a pool or patio and allow sun to shine through while keeping out bugs, flies, bees, mosquitoes, snakes and more. The screen of the enclosure can provide ultraviolet (UV) protection when enjoying the backyard, as well. The enclosure is generally fastened to a deck using deck sill tracks to create a barrier along the deck floor. When cleaning the deck, the water can be trapped by the tracks within the enclosure or diverted for egress through a distant door.

BRIEF SUMMARY

The embodiments are related to a horizontal screen deck drain system, a screen deck drain and method of use to drain water from a screened in enclosure.

In one aspect, a drain device for a screen enclosure having deck sill track portions, where two adjacent deck sill track portions form a pair of deck sill track portions. The device includes a U-shaped body having a first side, a second side, and a top surface extending between the first side and the second side. The body has a screen attaching side perpendicular to the first side and the second side and an opening that forms a drain port under the top surface and between the first side and the second side. The device includes concealed fasteners that couple the U-shaped body between and to the pair of deck sill track portions and so that the top surface of the U-shaped body is flush with a top surface of each deck sill track portion of the pair of deck sill track portions. The device includes a groove formed along the screen attaching side of the U-shaped body, the groove to receive an end of a screen to be attached to the pair of deck sill track portions and the U-shaped body.

In another aspect, a system is provided that includes deck sill track portions for a screen enclosure, where two adjacent deck sill track portions form a pair of deck sill track portions. The system includes a drain device comprising a U-shaped body having a first side, a second side and a top surface extending between the first side and the second side. The body includes a screen attaching side perpendicular to the first side and the second side and an opening that forms a drain port under the top surface and between the first side and the second side. The system includes concealed fasteners that couple the U-shaped body between and to the pair of deck sill track portions and so that the top surface of the U-shaped body is flush with a top surface of each deck sill track portion of the pair of deck sill track portions.

In another aspect, a method is provided, comprising providing a drain device; and installing the drain device between a pair of deck sill track portions.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1A:
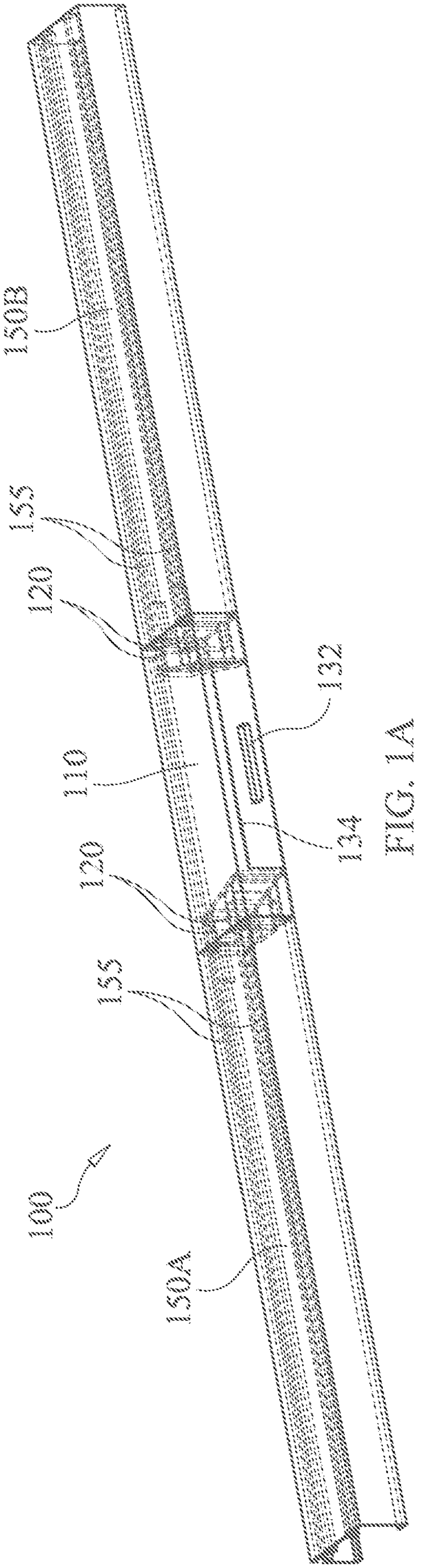
FIG. 1A illustrates a perspective view of a first side of a horizontal screen deck drain system in accordance with one embodiment.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Furthermore, unless otherwise clear from the context, a numerical value presented herein has an implied precision given by the least significant digit. Thus, a value 1.1 implies a value from 1.05 to 1.14. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

In some embodiments, the horizontal screen deck drain system includes a horizontal screen deck drain device that is mated with a sill screen track or integrated into a sill screen track. The horizontal screen deck drain device allows the flow of fluids to flow through the horizontal screen deck drain device when the door of the drain is in an open state.

In some embodiments, the horizontal screen deck drain system includes one or more horizontal screen deck drains placed along a length of a sill screen track.

In some embodiments, the horizontal screen deck drain system may be installed on a balcony or porch and the drain device is an accessory drain device that can be placed anywhere along a linear length of a drain system.

In some embodiments, the installation of the horizontal screen deck drain device may be reversed such that the interior or front side becomes the exterior or rear side. As a result, the terms "interior," "front," "exterior" and "rear" are used as a frame of references but may be reversed depending on the type of installation according to the application.

Figure 1B:
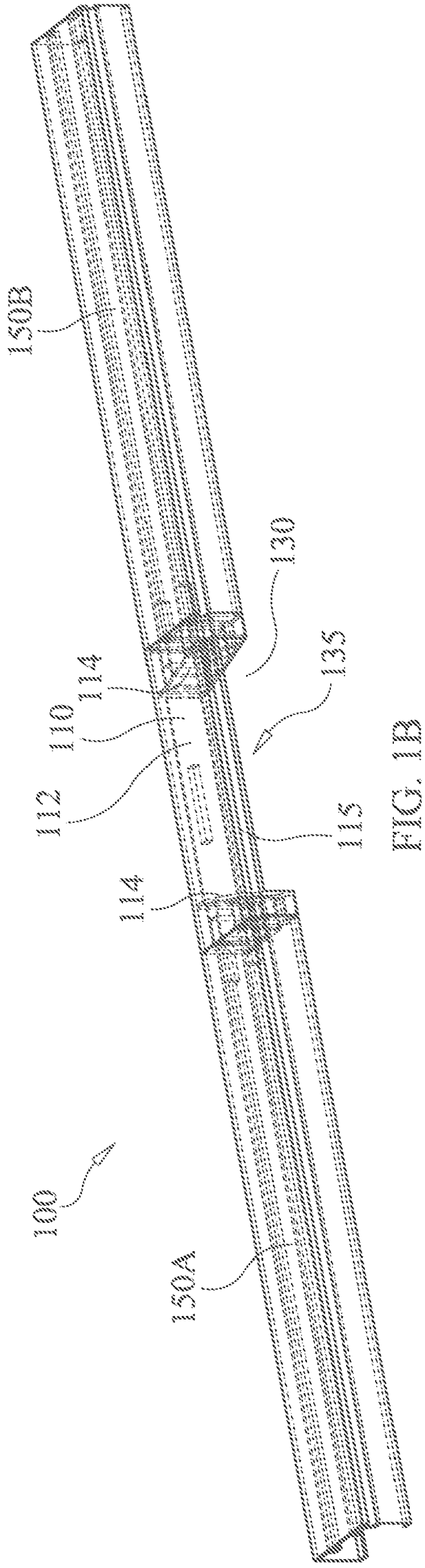
FIG. 1B illustrates a perspective view of a second side of a horizontal screen deck drain system in accordance with one embodiment.
Figure 2A:
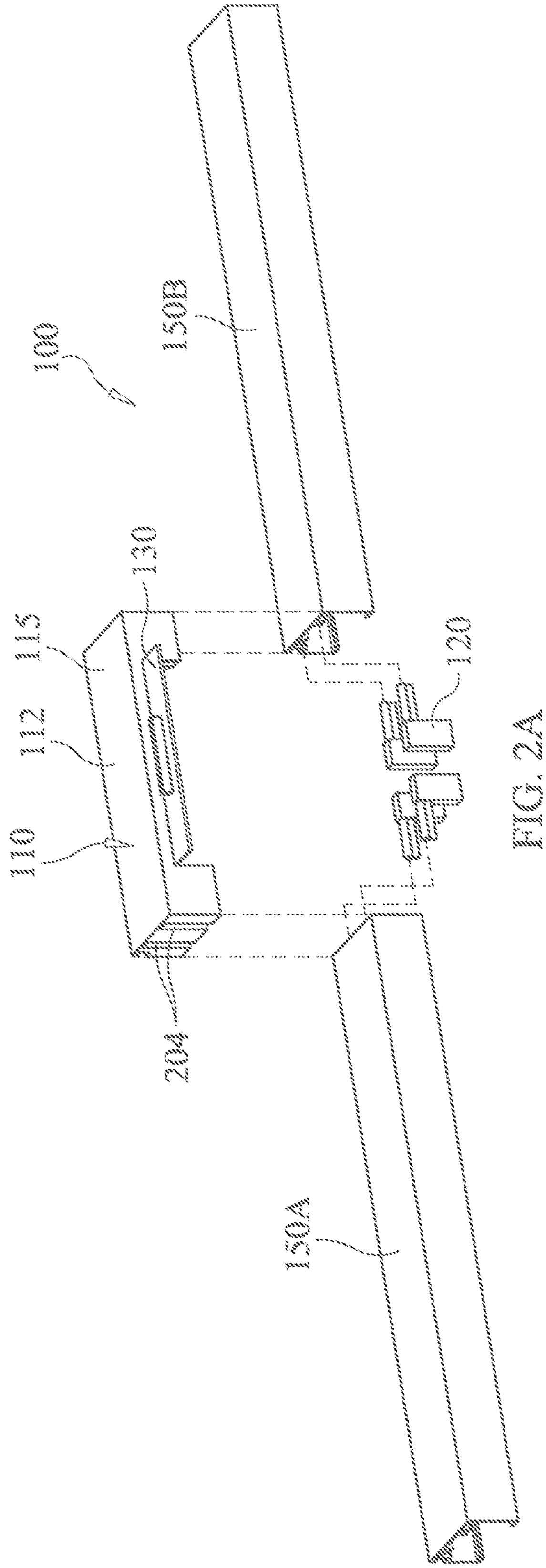
FIG. 2A illustrates an exploded view of a first side of a horizontal screen deck drain system in accordance with one embodiment.
Figure 2B:
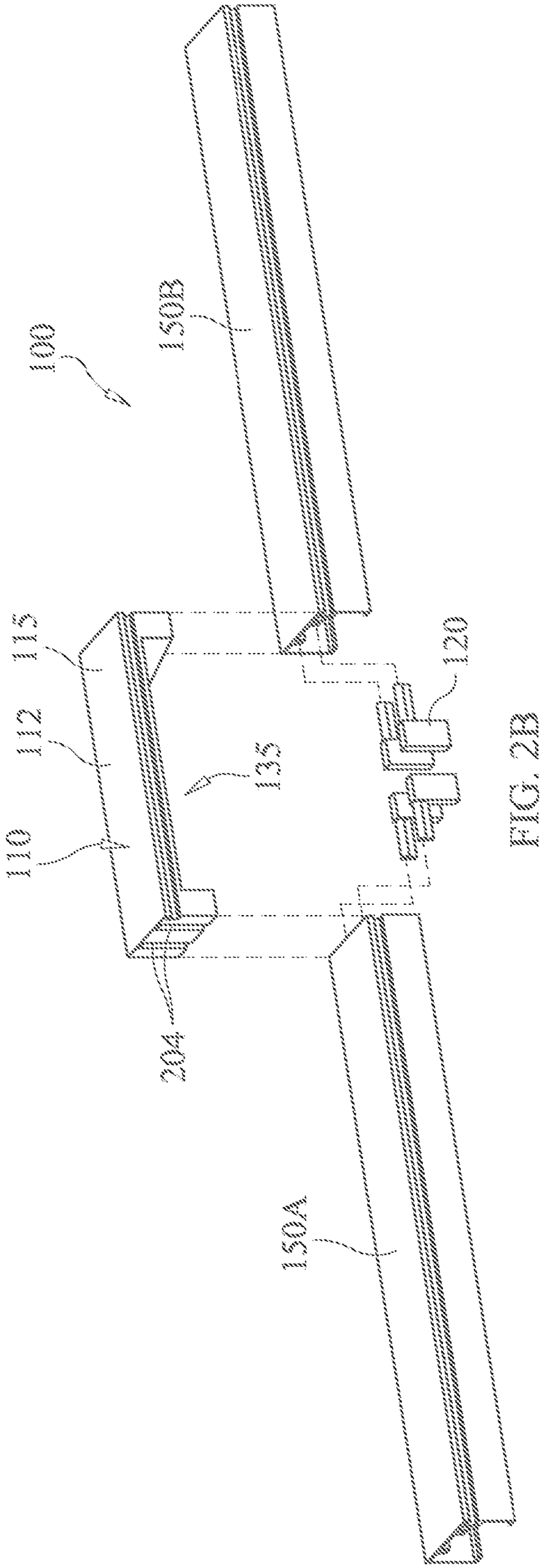
FIG. 2B illustrates an exploded view of a second side of a horizontal screen deck drain system in accordance with one embodiment.

The horizontal screen deck drain system 100 will be described in relation to FIGS. 1A, 1B, 2A and 2B. FIG. 1A illustrates a perspective view of a first side of a horizontal screen deck drain system 100 in accordance with one embodiment. FIG. 1B illustrates a perspective view of a second side of a horizontal screen deck drain system 100 in accordance with one embodiment. FIG. 2A illustrates an exploded view of a first side of a horizontal screen deck drain system 100 in accordance with one embodiment. FIG. 2B illustrates an exploded view of a second side of a horizontal screen deck drain system 100 in accordance with one embodiment.

The horizontal screen deck drain system 100 may include a horizontal screen deck drain device 110 that includes a U-shaped body 115 and fasteners 120. The system 100 may include deck sill track portions 150A and 150B. The horizontal screen deck drain device 110 includes a hinged door 130 to selectively open a drain port 135 through the U-shaped body. The fasteners 120 allows the horizontal screen deck drain device 110 to be interchanged with the sill track portions 150A and 150B, as will be described in more detail in relation to FIGS. 13A and 13B. The horizontal screen deck drain device 110 may be made of a durable plastic such as, without limitation, polypropylene. For the sake of illustration and description, the hinged door 130 is shown integrated into the front side of the U-shaped body, as the hinged door 130 would be accessible from inside of the screen enclosure.

Figure 14:
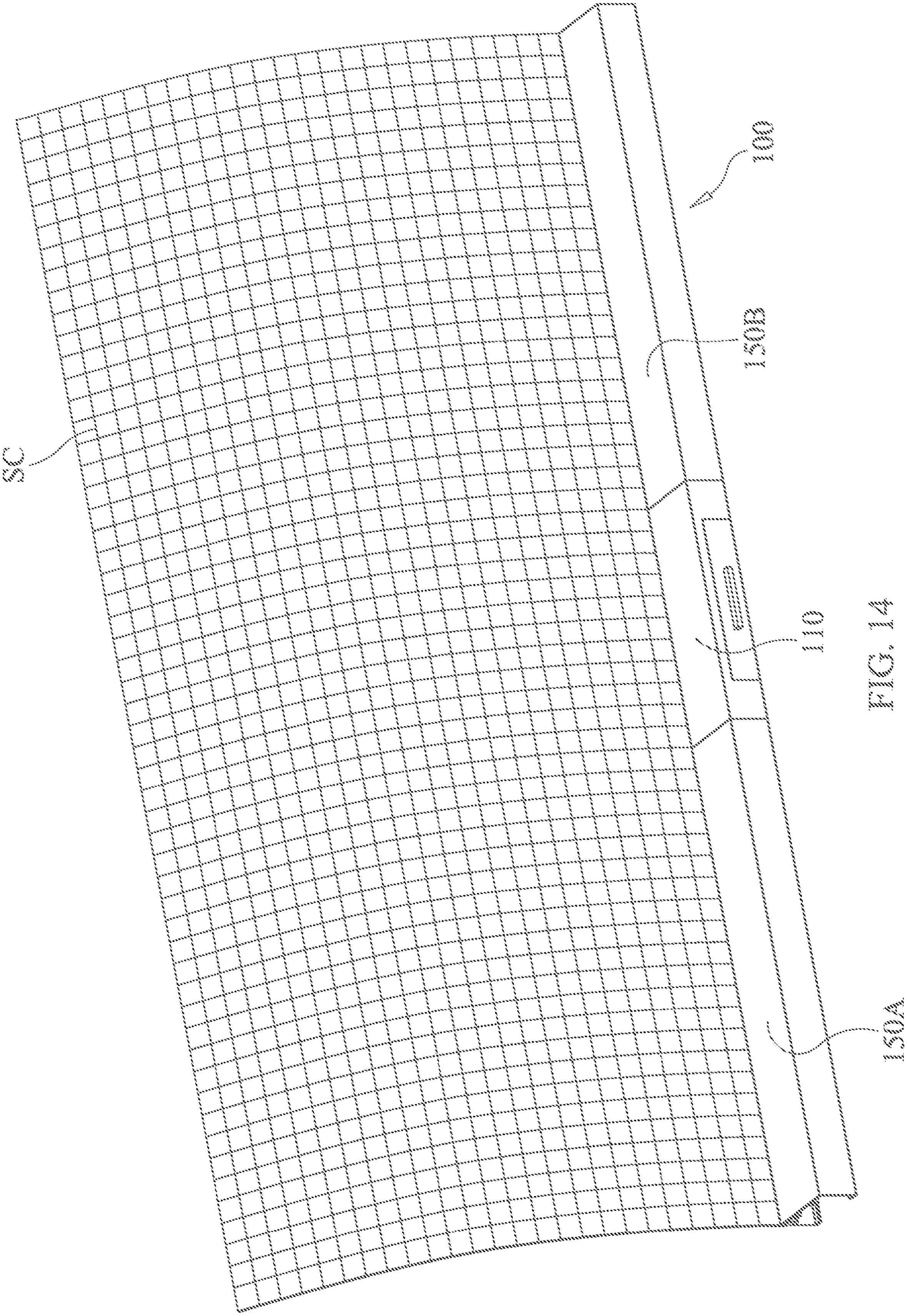
FIG. 14 illustrates a partial view of a screen enclosure using the horizontal screen deck drain system of FIGS. 1A and 1B.

In some embodiments, the horizontal screen deck drain system 100 may include a screen SC that may be installed on the drain device 110 and deck sill track portions 150A and 150B of a screen enclosure, as shown in FIG. 14.

Figure 9:
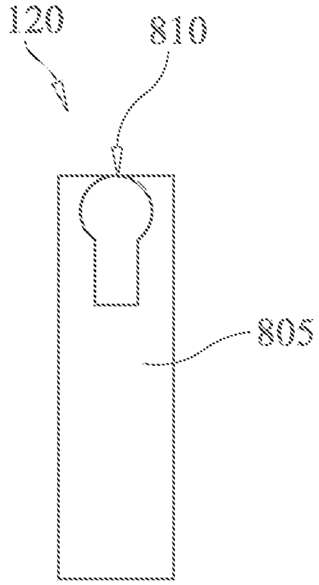
FIG. 9 illustrates a rear view of a force fit peg in accordance with one embodiment.
Figure 10:
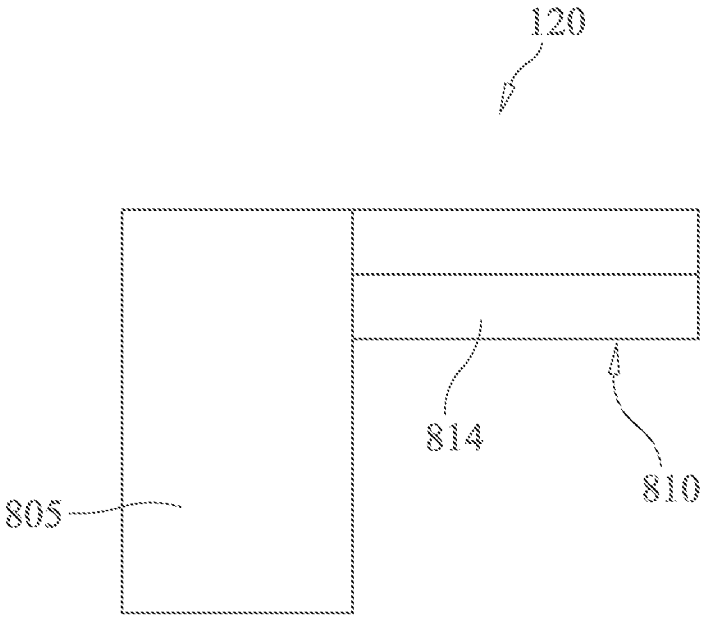
FIG. 10 illustrates a side view of a force fit peg in accordance with one embodiment.

The fasteners 120 may be a force fit peg, as will be described in more detail in relation to FIGS. 8-10. The fasteners 120 mate with deck sill track portions 150A and 150B and attach to the U-shaped body. The fasteners may include an adhesive applied to each side of the first and second sides of the U-shaped body to permanently affix the U-shaped body with deck sill track portions 150A and 150B. Additionally, depending on the deck sill track portions 150A and 150B, other fasteners may be used such a screws, straps, bands, or the like. An adhesive strip or band may be attached to the underside of the top surface of the U-shaped body and the underside of the top surfaces of the deck sill track portions 150A and 150B.

By way of non-limiting example, the fastener may include a fastener system that includes a plate that extends over a portion a first deck sill track portion 150A and the immediately adjacent side of the U-shaped body and at least one fastener to attach the plate. The at least one fastener may include an adhesive, glue, screws, etc. The fastener system may also include a plate that extends over a portion of the second deck sill track portion 150B and the immediately adjacent side of the U-shaped body and at least one fastener to attach the plate.

The U-shaped body 115 may include a top surface 112 and side walls 114. The side walls 114 depend from the top surface 112. One of the side walls 114 is on a first side of the U-shaped body 115. The other side wall 114 is on a second side of the U-shaped body 115. In some embodiments, an interior side of the side walls 114 are tapered to direct the flow of water, for example, from the interior of the screen enclosure to the exterior of the enclosure. In some embodiments, the hinged door 130 is hinged to top surface 112 via a hinge 134 such as, without limitation, a living hinge. The hinged door 130 may include a handle 132, such as a tab.

Referring now to FIGS. 2A and 2B, the side walls 114 include channels 204, which are dimensions to receive a portion of the fasteners 120. The side walls 114 are on the first side and second side of the U-shaped body 115. The body 115 has a screen attaching side (a front side or back side) perpendicular to the first side and the second side and an opening that forms a drain port under the top surface and between the first side and the second side.

Figure 3:
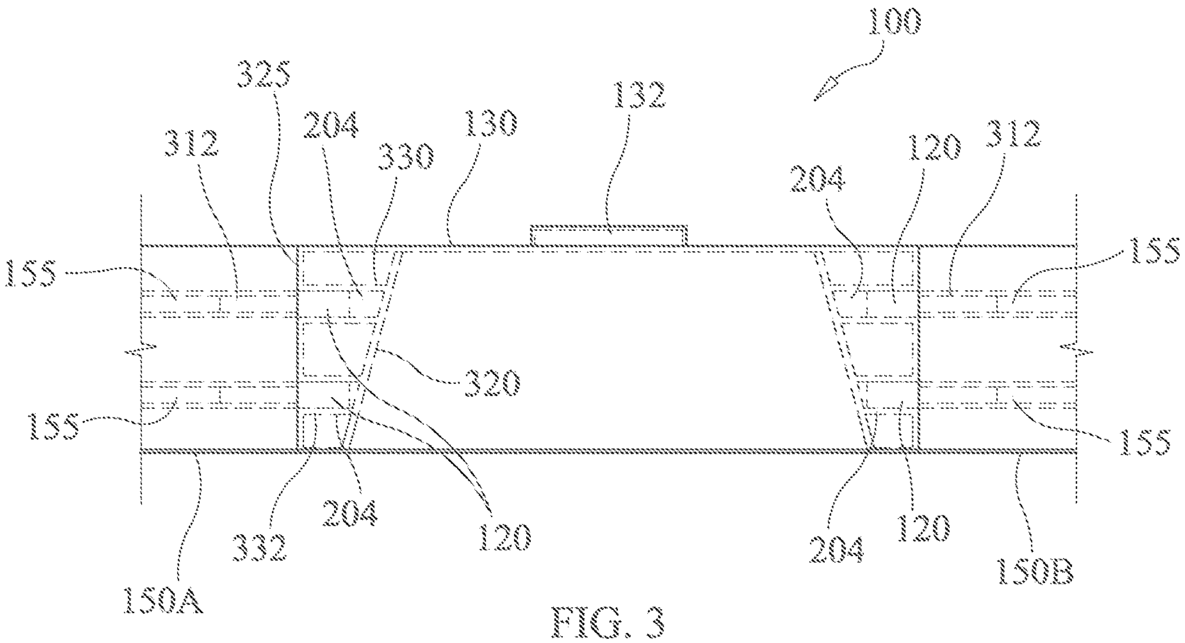
FIG. 3 illustrates a top view of the horizontal screen deck drain system in accordance with one embodiment.
Figure 4:
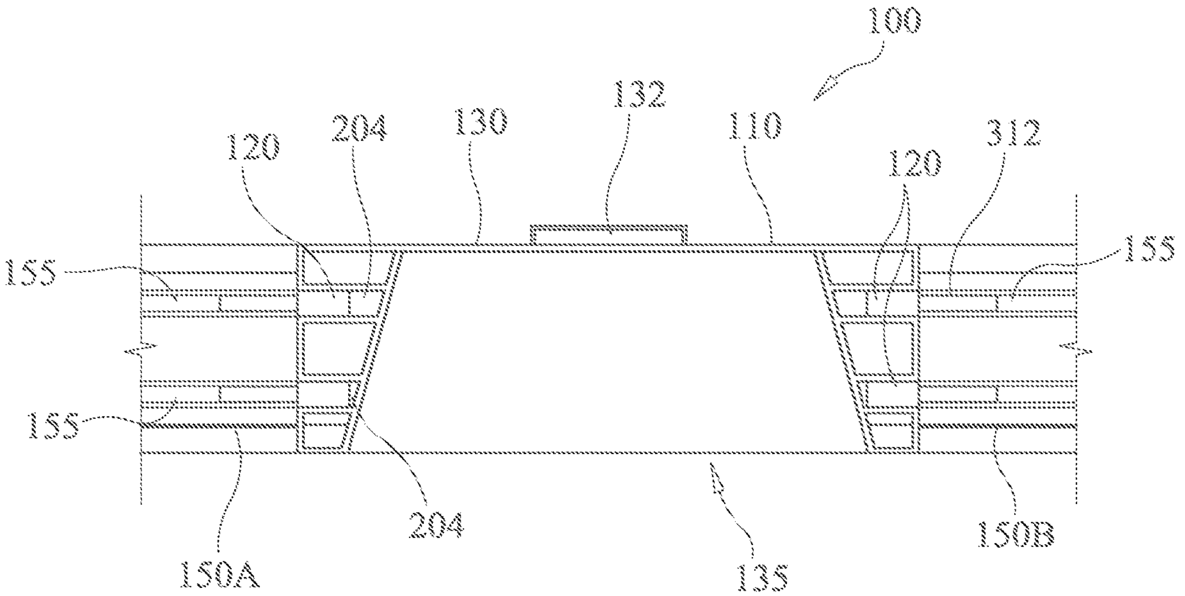
FIG. 4 illustrates a bottom view of the horizontal screen deck drain system in accordance with one embodiment.

FIG. 3 illustrates a top view of the horizontal screen deck drain system 100 in accordance with one embodiment. FIG. 4 illustrates a bottom view of the horizontal screen deck drain system 100 in accordance with one embodiment. Since each side walls 114 of the horizontal screen deck drain device 110 is essentially the same, only one of the side walls 114 will be described. The side wall 114 includes a first wall portion 320 and a second wall portion 325. The first wall portion 320 is angled or sloped so that the drain port 135 has a narrower entry port and a wider exit port. The second wall portion 325 has gaps formed therein. The side wall 114 includes pairs of parallel baffle wall sections 330 separated to form the gaps. The first pair with baffle wall sections 330 forms a first channel 204. The second pair with baffle wall sections 332 forms a second channel 204. The first side wall is angled relative to the second side wall diametrically opposing the first side wall to reduce the distance therebetween. This tapers the drain port to form a tapering drain port.

In some embodiments, the deck sill track portions 150A and 150B may include track channels 155 that are internal, parallel, and under the top surface of deck sill track portions 150A and 150B. Each track channel 155 receives the dowel portion 312 of the fastener 120. The channels 204 on each side of the body are closed on one end to the drain port under the top surface to generally maintain the fluid or water in the drain port.

Figure 5:
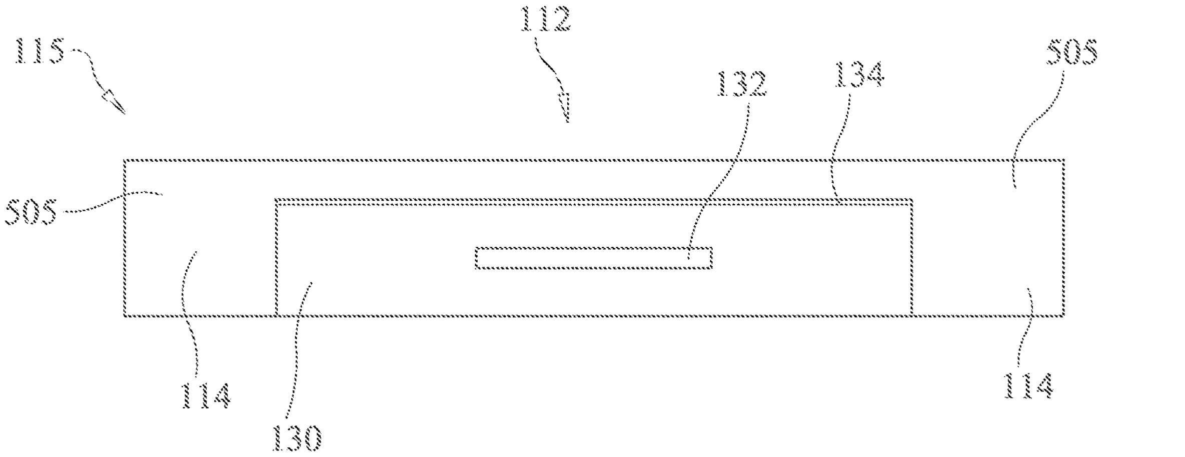
FIG. 5 illustrates an interior or front elevation view of the horizontal screen deck drain device in accordance with one embodiment.
Figure 6:
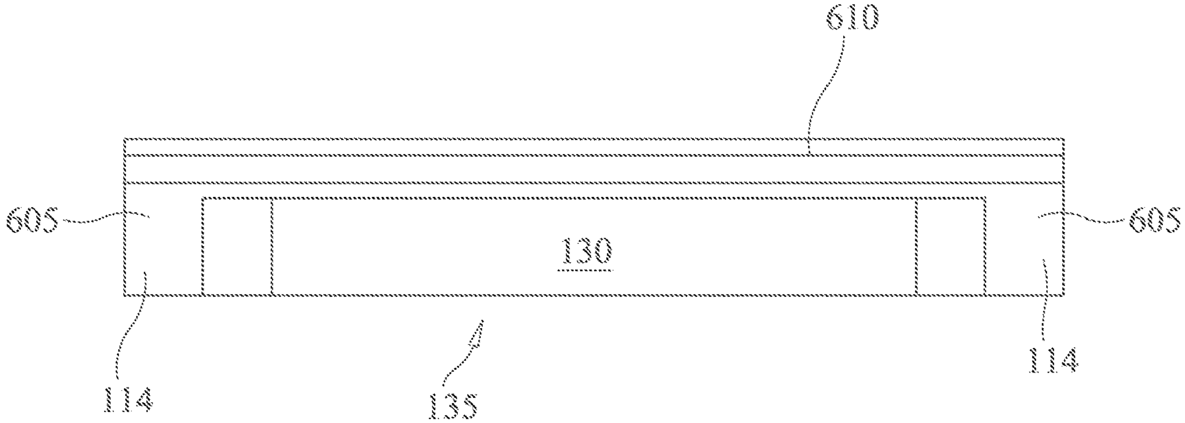
FIG. 6 illustrates an exterior or rear elevation view of the horizontal screen deck drain device in accordance with one embodiment.

FIG. 5 illustrates a front elevation view of the horizontal screen deck drain device 110 in accordance with one embodiment. FIG. 6 illustrates a rear elevation view of the horizontal screen deck drain device 110 in accordance with one embodiment. As shown in FIGS. 5 and 6, the side walls 114 include a front panel 505 and a rear panel 605. In FIG. 6, the hinged door 130 is shown closed. In the closed state, water is generally prevented from flowing through drain port 135. Additionally, the closed door 130 serves to prevent or minimize mosquitoes, flies, insects, small reptiles, etc. from entering the screen through the horizontal screen deck drain device 110. However, opening the hinged door 130 allows water to flow along the surface of the deck, balcony, or porch through the drain port 135 and out of the enclosure. The water flow from the interior side of horizontal screen deck drain device 110 to the exterior side of horizontal screen deck drain device 110. The rear panel 605 includes a groove 610 that matches and aligns with grooves of the track portions 150A and 150B. The grooves of the track portions and the groove 610 receive an end of a screen and a spline, for example, for fastening the screen to the track portions 150A and 150B and horizontal screen deck drain device 110. The groove 610 is configured to be aligned with the a similar groove on the screen attaching side of the track portions 150A and 150B.

The U-shaped body, when open, is constructed and arranged so that water or fluid naturally flows directly on the surface of the deck, balcony, or porch within the enclosure through the drain port 135 and unimpeded out of the enclosure. The U-shaped body is open when the door is open or if a door is omitted.

In some embodiments, such as for a balcony or porch, the door may be omitted from the horizontal screen deck drain device 110.

Figure 7:
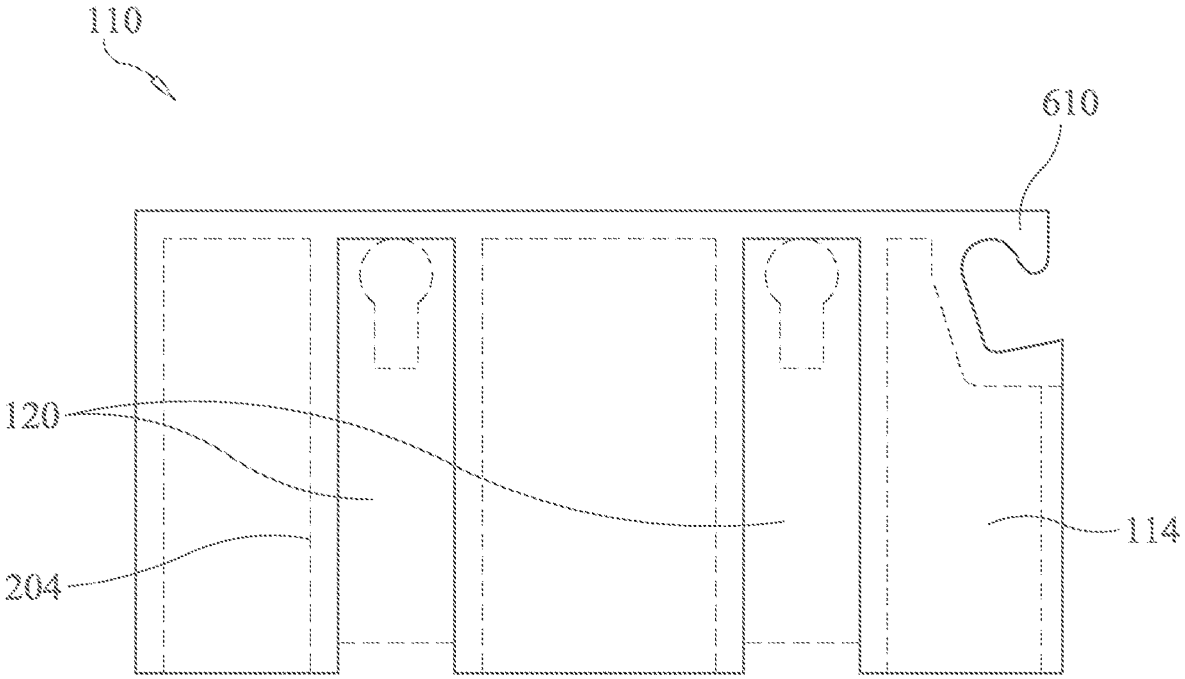
FIG. 7 illustrates a side view of the horizontal screen deck drain device in accordance with one embodiment.

FIG. 7 illustrates a side view of the horizontal screen deck drain device 110 in accordance with one embodiment. The side walls 114 on the left side and right side are essentially the same, so only one will be described in detail. In FIG. 7, the channels 204 are spaced apart and receives the fasteners 120 to align the U-shaped body 115 (FIGS. 1A and 1B) with the deck sill track portions 150A and 150B (FIGS. 1A and 1B). A cross-section of the groove 610 for receiving an end of the screen and the spline is shown.

Figure 8:
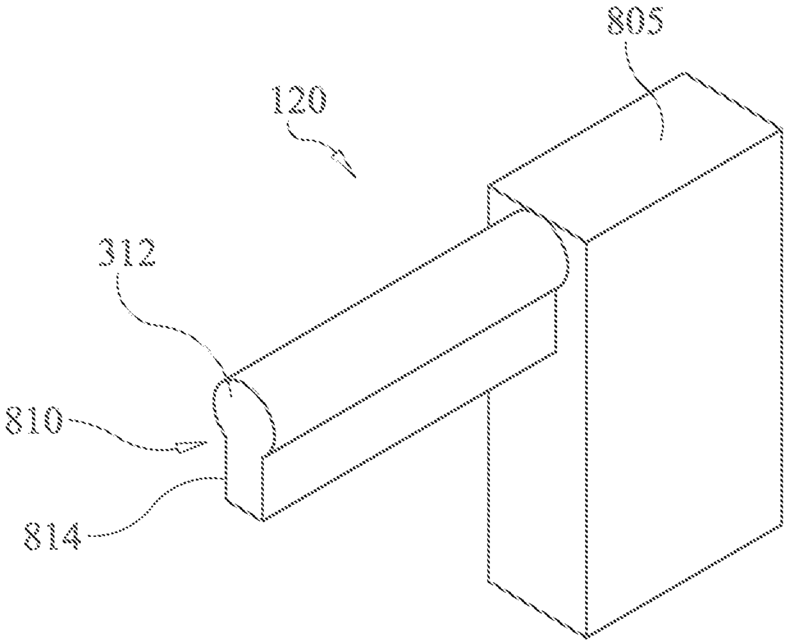
FIG. 8 illustrates a perspective view of a force fit peg in accordance with one embodiment.

FIG. 8 illustrates a perspective view of a force fit peg (i.e., fasteners 120) in accordance with one embodiment. FIG. 9 illustrates a rear view of a force fit peg (i.e., fasteners 120) in accordance with one embodiment. FIG. 10 illustrates a side view of a force fit peg (i.e., fasteners 120) in accordance with one embodiment. The peg includes a first peg portion 805 and a second peg portion 810. The first peg portion 805 is friction fit coupled in a channel 204 of the U-shaped body 115. The second peg portion 810 is configured to mate with a track channel 155 in one of the deck sill track portions 150A and 150B. The first peg portion 805 has a geometrical shape that fits in the channels 204. For illustrative purposes, the shape is shown as generally rectangular in shape. However, other shapes may be used. The second peg portion 810 includes a dowel portion 312 and a track tab 814. The dowel portion 312 and a track tab 814 are dimensions to fit and mate with track channel 155.

Figure 11:
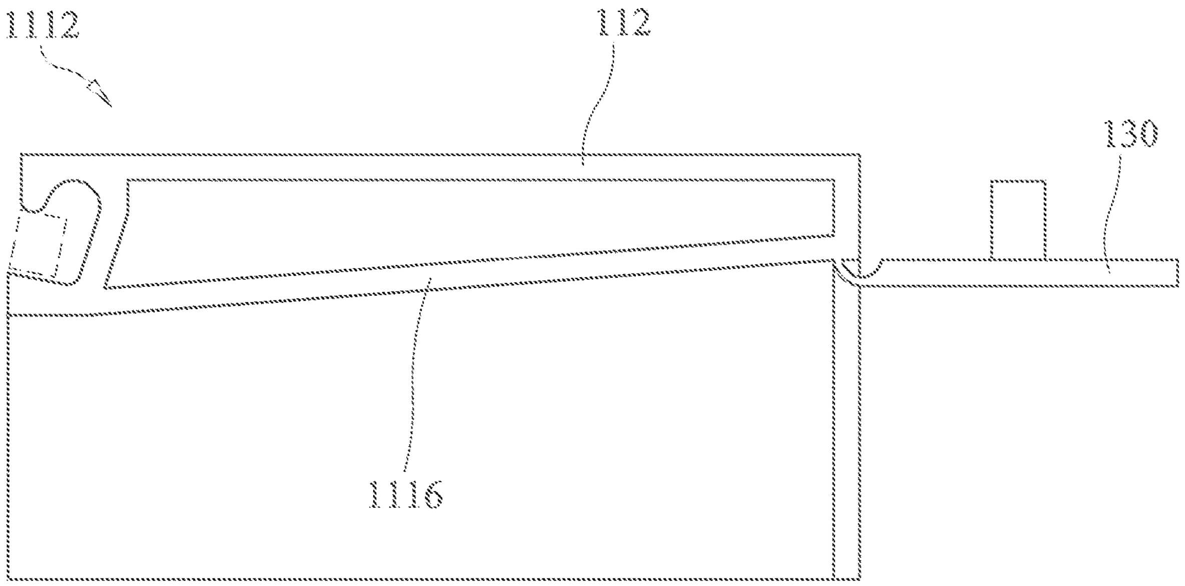
FIG. 11 illustrates a cross sectional view along a center of a short side of the horizontal screen deck drain device of FIG. 2A with the door open in accordance with one embodiment.
Figure 12:
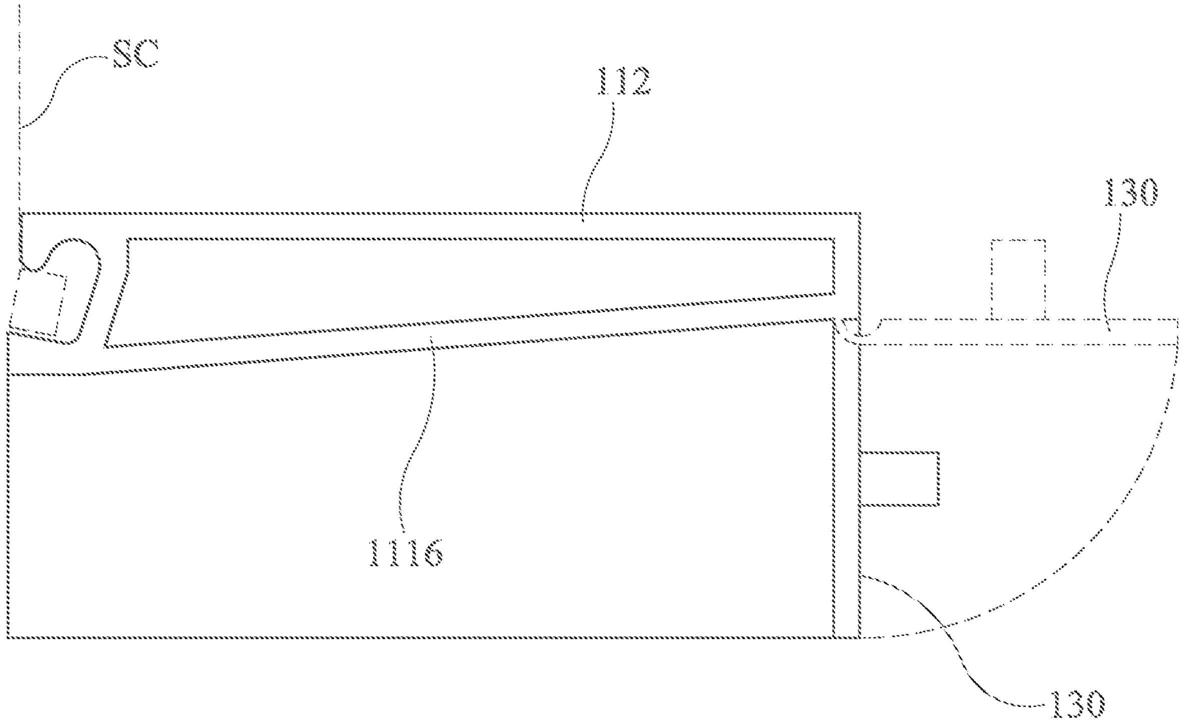
FIG. 12 illustrates a cross sectional view along a center of a short side of the horizontal screen deck drain device of FIG. 1A with the door closed and the door open shown in phantom in accordance with one embodiment.

FIG. 11 illustrates a cross sectional view taken along a center of a short side of the horizontal screen deck drain device 110 of FIG. 2A in accordance with one embodiment. In FIG. 2A the door is open. In FIG. 11, the horizontal screen deck drain device 110 may have a top section 1112. FIG. 12 illustrates a cross sectional view along a center of a short side of the horizontal screen deck drain device 110 of FIG. 1A with the door closed and the door open shown in phantom in accordance with one embodiment.

As shown in FIG. 11, the top section 1112 of the horizontal screen deck drain device 110 includes the top surface 112 that is generally flat or parallel to a horizontal plane. The top surface 112 in some embodiments may be configured to be flush with a top surface of the deck sill track portions 150A and 150B (FIGS. 1A and 1B). The top section 1112 may also include a second surface 1116 below the top surface 112 in spaced relation. The second surface 1116 may be sloped in the direction from the interior or front side to the exterior or rear side. The screen SC, denoted in a dashed line, is installed on the exterior side of the top section 1112 of the horizontal screen deck drain device 110. Then a spline is inserted into the groove to secure the screen SC in place.

Screen enclosures for pools and patios are often constructed of a system of mated tracks, beams and joints. The horizontal screen deck drain device 110 described herein may be an accessory for use with screen enclosure systems. The fasteners 120 would be configured to mate with the track portions of the screen enclosure so that a drain may be conveniently placed for drainage of the water into a flower bed outside of the enclosure or other preferred location.

In other embodiments, the track portions may be integrated with the drain device to form a single linear structure. In the embodiment of the single linear structure, the fasteners may be removed.

Figure 13A:
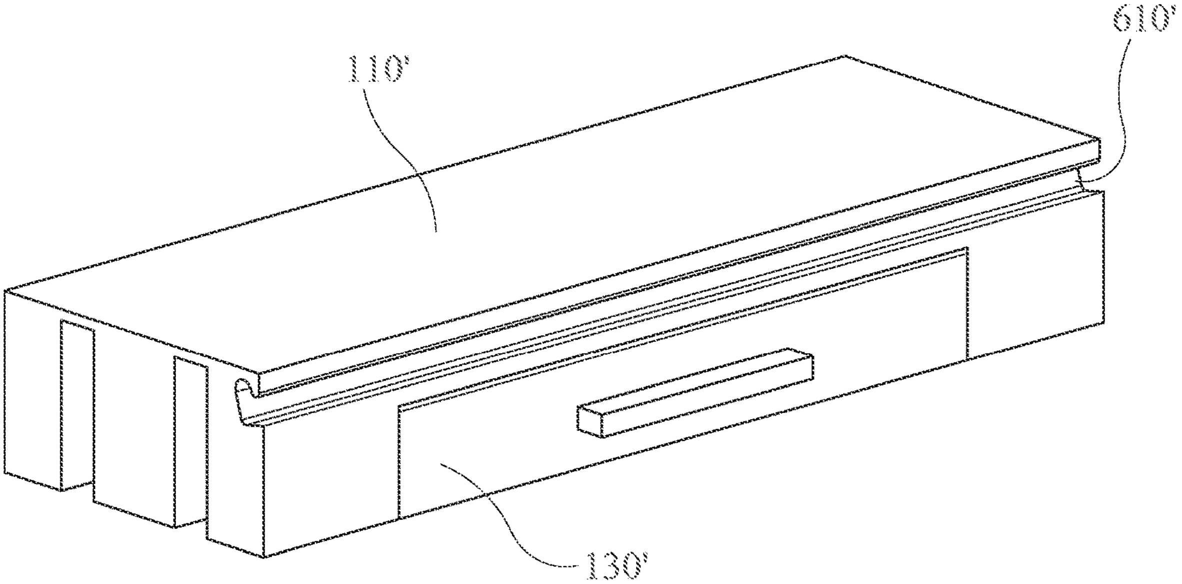
FIG. 13A illustrates a front perspective view of a horizontal screen deck drain device for a balcony, with the door closed.
Figure 13B:
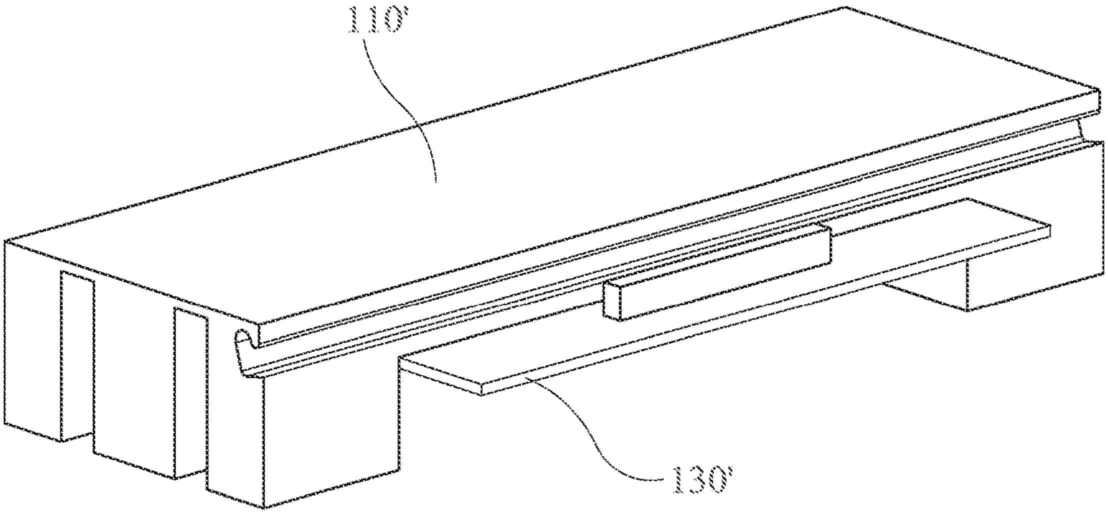
FIG. 13B illustrates a front perspective view of the horizontal screen deck drain device of FIG. 13A, with the door open.

FIG. 13A illustrates a front perspective view of a horizontal screen deck drain device 110' for a balcony, with the door closed. FIG. 13B illustrates a front perspective view of the horizontal screen deck drain device of FIG. 13A, with the door open. The horizontal screen deck drain device 110' is essentially the same as the horizontal screen deck drain device 110 so only the differences will be described. The horizontal screen deck drain device 110' includes groove 610' (i.e., groove 610) on the front side of the U-shaped body. When the horizontal screen deck drain device 110' is fastened to the track portions 150A and 150B, the groove 610' matches and aligns with grooves of the track portions 150A and 150B. The hinged door 130' is hinged with a living hinge, for example. However, the hinged door 130' may be smaller in height to accommodate for the groove 610'. The groove 610' is formed below the top surface of the U-shaped body and above the living hinge. In this arrangement, the screen attaching side is the front side or the side with the door 130'.

Balconies may include a balcony handrail. The screen SC may be placed on the interior side of the balcony rail. In this instance, the horizontal screen deck drain device 110' may be placed partially under the balcony rail. The door 130' is accessible from the interior side of the balcony rail.

The balcony may be screened elevated balconies, on elevated decks, or patios with a handrail in proximity to a perimeter edge of the balcony, patio, deck, etc. The system 100 described herein may interchange the horizontal screen deck drain device to accommodate the installation of the screen. The system 100 can reverse the track portions so that the groove for screen attachment accommodation. Accordingly, the device 110 can be reversed so that the front side of the U-shaped body observed from an enclosure may become the back side of the U-shaped body observed from an enclosure.

FIG. 14 illustrates a partial view of a screen enclosure using the horizontal screen deck drain system 100 of FIGS. 1A and 1B. The screen enclosure includes screen SC that is attached to the screen attaching side of the U-shaped body of the deck drain device 110. In this arrangement, the screen attaching side of the U-shaped body is the back side of the body. The deck sill track portions 150A and 150B are shown on each side of the deck drain device 110. The screen SC is also attached to the screen attaching side of the deck sill track portions 150A and 150B.

In some embodiments, the deck sill track portions 150A and 150B and the deck drain device 110 may be a unitary piece formed together. In this case, the fasteners may be omitted.

Figure 15:
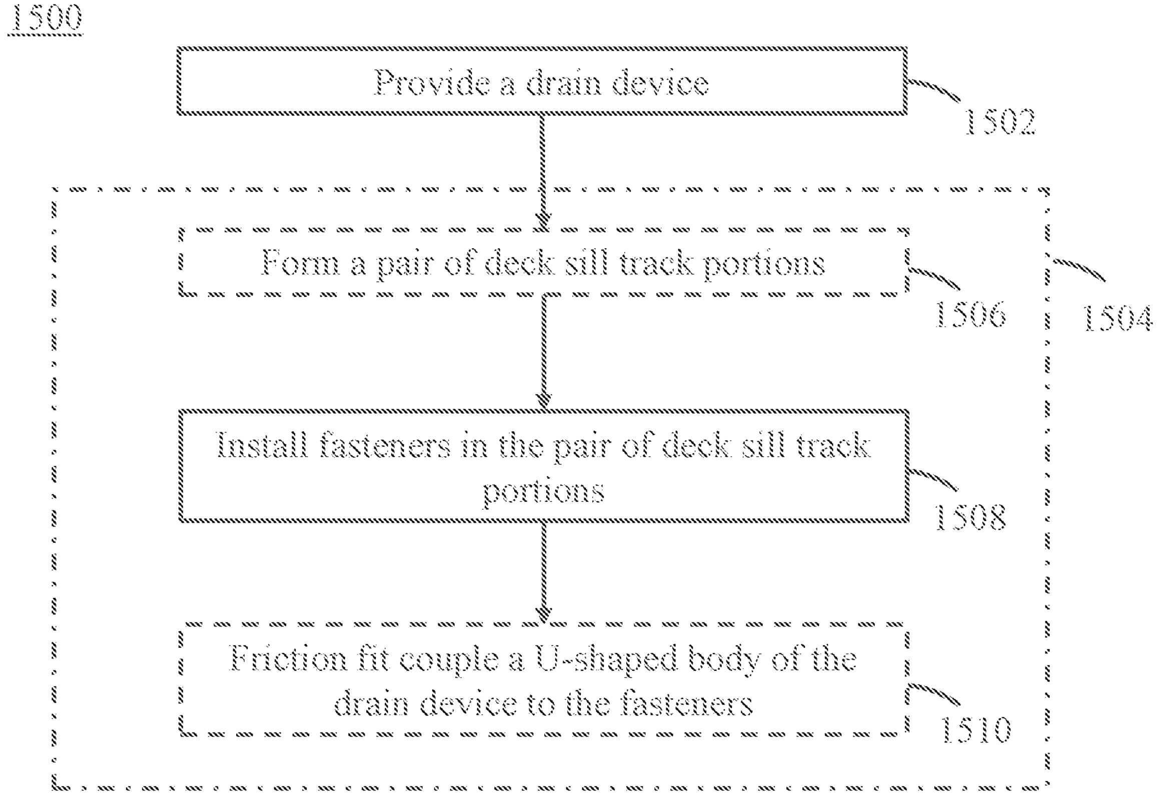
FIG. 15 illustrates a flowchart of a method for installing a drain device for a screen enclosure

FIG. 15 illustrates a flowchart of a method 1500 for installing a drain device 110 for a screen enclosure. The method may be performed in the order shown or a different order. One or more of the steps may be omitted. One or more of the steps may be performed contemporaneously. One or more steps may be added.

The method 1500 may include, at block 1502, providing a drain device 110 or 110' and, at block 1504, installing the drain device 110 or 110' between a pair of deck sill track portions 150A and 150B.

The method may include, at block 1506, forming a pair of deck sill track portions 150A and 150B before or during installing the drain device110 or 110'. This step may be performed during the installation or during a pre-fabrication process.

In some embodiments, the screen enclosure may already exist. Thus, to install the drain device 110 or 110' a section may be cut out of a single deck sill track to form the pair of deck sill track portions 150A and 150B. Still further, in some embodiments, the single deck sill track may already be installed on a deck of a pool or balcony. In this instance, a pair of deck sill track portions 150A and 150B may be formed without the need to remove the single deck sill track. The section may have a length that corresponds to the length of the U-shaped body of the drain device 110 or 110'.

In some embodiments, a pair of deck sill track portions 150A and 150B may be pre-formed prior to installation of a screen enclosure.

The method 1500 when installing the drain device at block 1504, may include installing friction fit fasteners to secure the drain device such as, in the pair of deck sill track portions, at block 1508. In some embodiments, the fasteners are concealable and hidden in the channels.

In some embodiments, when installing the drain device, a force fit peg is used. In this embodiment, the method 1500 when installing the drain device, at block 1504, may include friction fit coupling a U-shaped body of the drain device to the fasteners, at block 1510.

In some embodiments, the installing of the fasteners may include securing the drain device to the pair of deck sill track portions using a plate, strap or other fastener. This forms an assembly with a drain system. Then the assembly may be affixed to the balcony, porch or a pool deck in a conventional manner. In other words, the deck sill track portions may be installed in a conventional manner.

In view of the foregoing, the horizontal screen deck drain system includes a drain device with a U-shaped body and fasteners. The fasteners mate with deck sill track portions and attach to the U-shaped body. The drain device may include a hinged door coupled to an opening in the U-shaped body to selectively open a drain port through the U-shaped body. The U-shaped body includes a top surface that is configured to be flush with a top surface of the deck sill track portions. The fasteners couple or removably attach the U-shaped body between and to the pair of deck sill track portions and so that the top surface of the U-shaped body is flush with a top surface of each deck sill track portion of the pair of deck sill track portions.

In some embodiments, the drain device for a horizontal screen deck drain system having deck sill track portions includes a U-shaped body that includes a first side, a second side, and a top surface extending between the first side and the second side. The U-shaped body also includes a front side, a back side, and a groove formed along a screen attaching side. The groove receives an end of a screen attached to the pair of deck sill track portions. The screen attaching side is one of the front side and back side. The U-shaped body also includes an opening that forms a drain port under the top surface, the drain port is between the first side and the second side and extends from the front side to the back side to allow a fluid to drain through the drain port.

Figure 16:
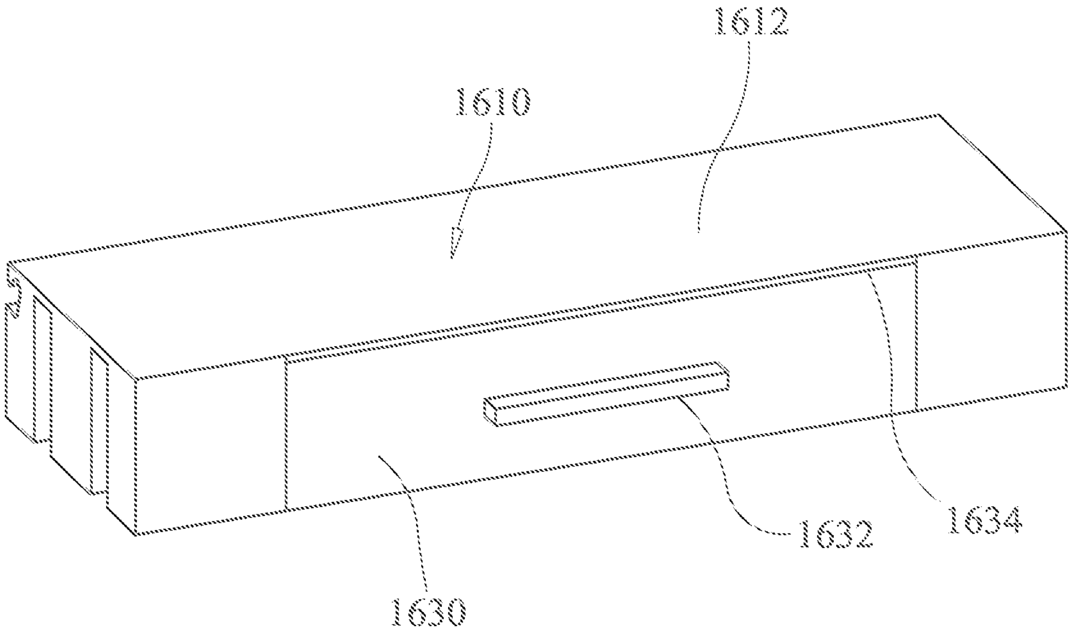
FIG. 16 illustrates a perspective view of an interior or front elevation view of the horizontal screen deck drain device in accordance with one embodiment.

FIG. 16 illustrates a perspective view of an interior or front elevation view of the horizontal screen deck drain device 1610 in accordance with one embodiment. The U-shaped body 115 may include a top surface 1612 and side walls 114 (FIG. 1A). The side walls depend from the top surface 1612. The horizontal screen deck drain device 1610 is similar to the horizontal screen deck drain device 110, so only the differences will be described.

In some embodiments, the hinged door 1630 is hinged to top surface 1612 via a hinge 1634 such as, without limitation, a living hinge. The hinged door 1630 may include a handle 1632 such as a tab. In this illustration, the door is taller. The hinge 1634 may be located at the edge of the top surface 1612. The remaining differences are shown in FIG. 17.

Figure 17:
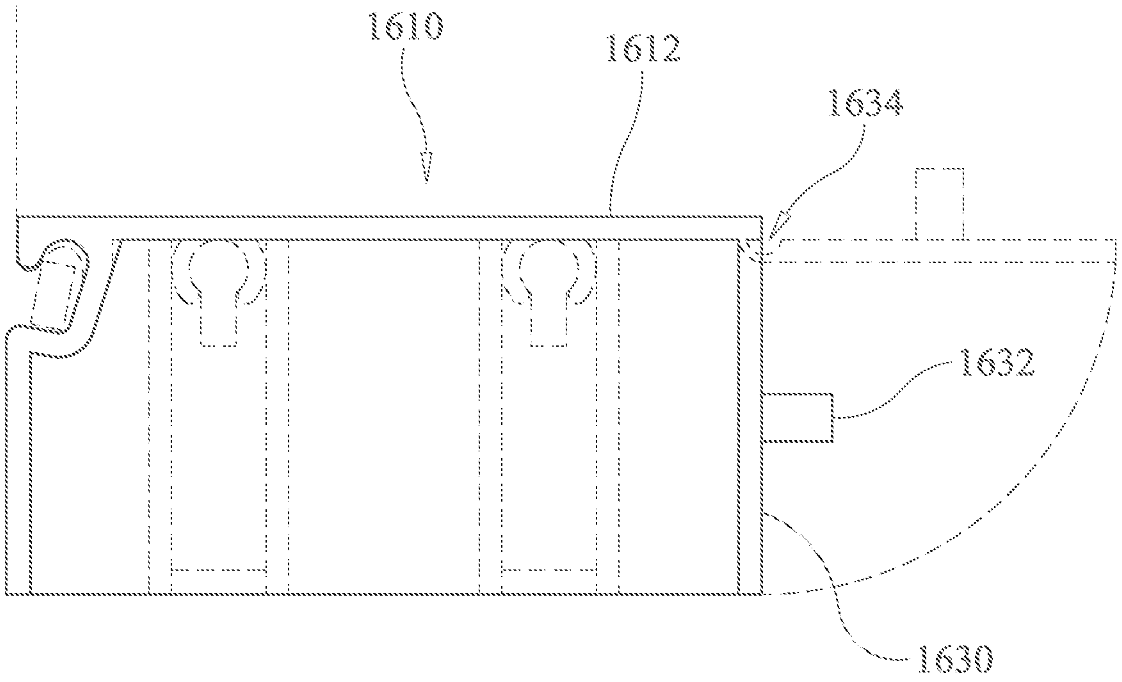
FIG. 17 illustrates a cross sectional view along a center of a short side of the horizontal screen deck drain device of FIG. 16 with the door closed and door open shown in phantom in accordance with one embodiment.

FIG. 17 illustrates a cross sectional view along a center of a short side of the horizontal screen deck drain device 1610 of FIG. 16 with the door closed and door open shown in phantom in accordance with one embodiment. The difference in FIG. 17 can be seen based on a comparison with FIGS. 11 and 12. The second surface 1116 in FIGS. 11 and 12 has been removed below the top surface 1612 (i.e., top surface 112).

In some embodiments, such as for a balcony or porch, the door may be omitted from the horizontal screen deck drain device 1610.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including." "includes," "having." "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another. As used herein the expression "at least one of A and B," will be understood to mean only A, only B, or both A and B. Moreover, unless specifically stated, any use of the terms front, back, etc., are used to provide a frame of reference of an element when describing said element and since an element may be turned around, the front of an element may become the back of the element.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

What is claimed is:

1. A drain device for a screen enclosure having deck sill track portions, where two adjacent deck sill track portions form a pair of deck sill track portions, the drain device comprising:

a U-shaped body having a first side, a second side, a front side, a back side, a top surface extending between the first side and the second side, a screen attaching side perpendicular to the first side and the second side, and an opening that forms a drain port under the top surface and between the first side and the second side, wherein the opening comprises a first side wall on the first side that extends from the front side to the back side below the top surface and a second side wall on the second side that extends from the front side to the back side below the top surface, and wherein the first side wall includes at least one first channel closed on one end to the drain port under the top surface and the second side wall includes at least one second channel closed on one end to the drain port under the top surface;

concealed fasteners that couple the U-shaped body between and to the pair of deck sill track portions such that the top surface of the U-shaped body is flush with a top surface of each deck sill track portion of the pair of deck sill track portions; and a groove formed along the screen attaching side of the U-shaped body, the groove to receive an end of a screen to be attached to the pair of deck sill track portions and the U-shaped body.

2. The drain device of claim 1, wherein the front and back sides are perpendicular to the first side and the second side and the screen attaching side includes one of the front side and the back side.

3. The drain device of claim 1, further comprising a hinged door coupled to one of the front side and the back side of the U-shaped body to close one end of the opening in the U-shaped body and selectively open the drain port to allow a fluid to flow through the U-shaped body.

4. The drain device of claim 1, wherein the drain port is a tapering drain port that tapers from the front side to the back side; and an interior side of the first side wall is angled relative to an interior side of the second side wall to reduce a distance between the interior side of the first side wall and the interior side of second side wall to form the tapering drain port.

5. The drain device of claim 1, wherein:

the fasteners include:

at least one first fastener that mates with a first deck sill track portion of the pair of deck sill track portions and the at least one first channel, and at least one second fastener that mates with a second deck sill track portion of the pair of deck sill track portions and the at least one second channel.

6. The drain device of claim 5, wherein:

the at least one first fastener comprises two first fasteners;

the at least one second fastener includes two second fasteners;

the at least one first channel includes two parallel first channels in the first side wall; and the at least one second channel includes two parallel second channels in the second side wall.

7. The drain device of claim 6, wherein each first fastener and each second fastener include a force fit peg.

8. The drain device of claim 5, wherein the U-shaped body, the at least one first fastener, and the at least one second fastener are made of polypropylene.

9. A system, comprising:
deck sill track portions for a screen enclosure, where two adjacent deck sill track portions form a pair of deck sill track portions;
a drain device including a U-shaped body having a first side, a second side, a front side, a back side, a top surface extending between the first side and the second side, a screen attaching side perpendicular to the first side and the second side, and an opening that forms a drain port under the top surface and between the first side and the second side, wherein the opening comprises a first side wall on the first side that extends from the front side to the back side below the top surface and a second side wall on the second side that extends from the front side to the back side below the top surface, and wherein the first side wall includes at least one first channel closed on one end to the drain port under the top surface and the second side wall includes at least one second channel closed on one end to the drain port under the top surface; and
concealed fasteners that couple the U-shaped body between and to the pair of deck sill track portions and so that the top surface of the U-shaped body is flush with a top surface of each deck sill track portion of the pair of deck sill track portions.

10. The system of claim 9,
wherein the front and back sides are perpendicular to the first side and the second side and the screen attaching side includes one of the front side and the back side; and
wherein the U-shaped body further comprises a groove formed along the screen attaching side of the U-shaped body, the groove to receive an end of a screen to be attached to the pair of deck sill track portions and the U-shaped body.

11. The system of claim 9, wherein the drain device further comprises a hinged door coupled to one of the front side and the back side of the U-shaped body to close the opening in the U-shaped body and selectively open the drain port to allow a fluid to flow through the U-shaped body.

12. The system of claim 9,
wherein the drain port is a tapering drain port that tapers from the front side to the back side; and
wherein an interior side of the first side wall is angled relative to an interior side of the second side wall to reduce a distance between the interior side of the first side wall and the interior side of the second side wall to form the tapering drain port.

13. The system of claim 9, wherein:
the fasteners include:
at least one first fastener that mates with a first deck sill track portion of the pair of deck sill track portions and the at least one first channel; and
at least one second fastener that mates with a second deck sill track portion of the pair of deck sill track portions and the at least one second channel.

14. The system of claim 13, wherein:
the at least one first fastener comprises two first fasteners;
the at least one second fastener includes two second fasteners;
the at least one first channel includes two parallel first channels in the first side wall; and
the at least one second channel includes two parallel second channels in the second side wall.

15. The system of claim 14, wherein each first fastener and each second fastener include a force fit peg.

16. The system of claim 9, wherein the deck sill track portions include a screen attaching side; and further comprising:
a screen to be attached to the screen attaching side of the deck sill track portions and the screen attaching side of the U-shaped body.

17. The system of claim 16, further comprising:
a plurality of the pair of deck sill track portions; and
a plurality of the drain devices to form the screen enclosure.

18. A method, comprising:
providing a drain device, wherein the drain device comprises: a U-shaped body having a first side, a second side, a front side, a back side, a top surface extending between the first side and the second side, a screen attaching side perpendicular to the first side and the second side, and an opening that forms a drain port under the top surface and between the first side and the second side, wherein the opening comprises a first side wall on the first side that extends from the front side to the back side below the top surface and a second side wall on the second side that extends from the front side to the back side below the top surface, and wherein the first side wall includes at least one first channel closed on one end to the drain port under the top surface and the second side wall includes at least one second channel closed on one end to the drain port under the top surface; concealed fasteners that couple the U-shaped body between and to a pair of deck sill track portions such that the top surface of the U-shaped body is flush with a top surface of each deck sill track portion of the pair of deck sill track portions; and a groove formed along the screen attaching side of the U-shaped body, the groove to receive an end of a screen to be attached to the pair of deck sill track portions and the U-shaped body; and
installing the drain device between the pair of deck sill track portions.

19. The method of claim 18, further comprising:
forming the pair of deck sill track portions before installing the drain device.

20. The method of claim 19, wherein the installing the drain device includes:
installing the fasteners of the drain device in the U-shaped body; and
friction fit coupling the U-shaped body of the drain device to the pair of deck sill track portions using the fasteners to form an assembly with a drain system.

* * * * *